March 8, 1938.  R. J. JOHNSON  2,110,156
HUMANE TRAP
Filed Sept. 10, 1936
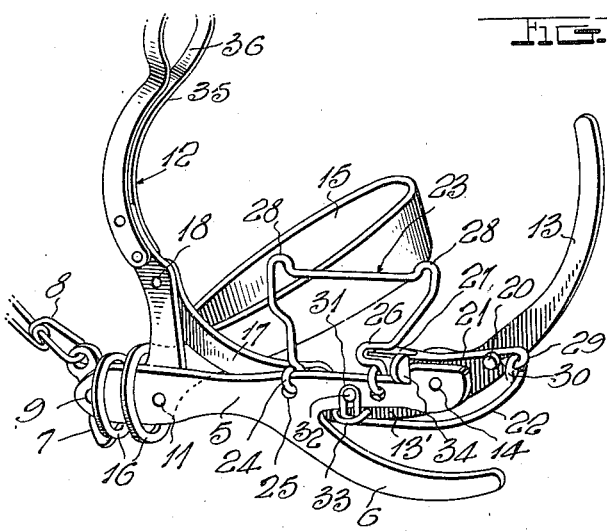
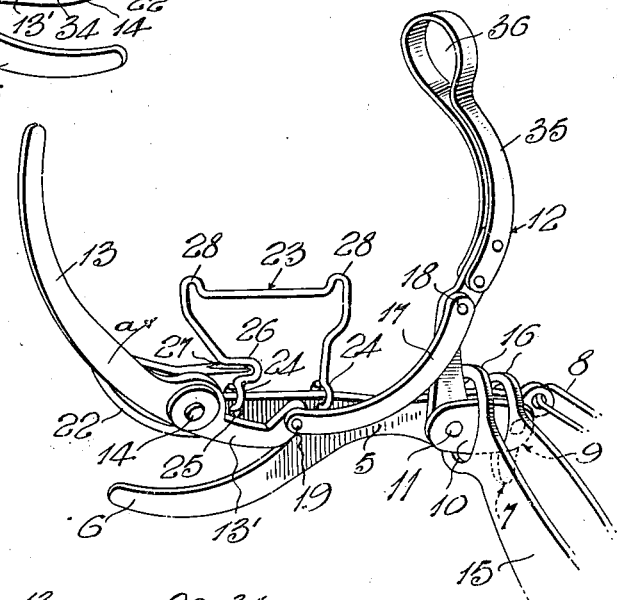
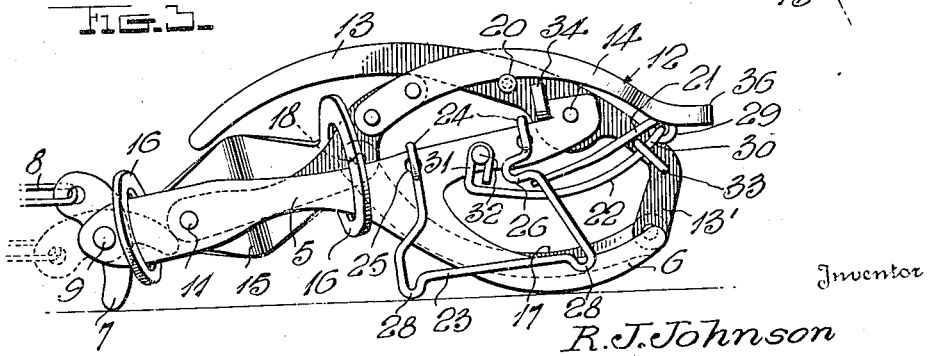
Inventor
R. J. Johnson
By H. R. Willson & Co.
Attorneys Patented Mar. 8, 1938

2,110,156

UNITED STATES PATENT OFFICE 2,110,156

HUMANE TRAP

Richard J. Johnson, Langdon, Minn.

Application September 10, 1936, Serial No. 100,199

12 Claims. (Cl. 43—88)

The invention relates to improvements in traps designed primarily for setting in burrows or other openings, and it aims primarily to provide a trap in which the entrapped animal is instantly killed by pressure around the neck.

A further object is to provide a trap which will not close far enough to catch the leg or foot of a small animal and one which may be released by a large animal should he catch a leg therein.

A still further object is to provide a trap which may be easily released by the trapper should he become accidentally caught.

A still further object is to provide a trap from which the actuating spring is readily detachable so that it may be carried separately from the trap if desired.

Another object is to provide new and improved releasing mechanism including an upstanding trigger between downwardly and inwardly swingable jaws against which the animal pushes with his chest, insuring that the head shall be sufficiently far advanced at the time of springing the trap, to allow the jaws to close around the neck.

Yet another aim is to provide a novel base for the trap cooperable with the spring in supporting it in any desired position in readiness for the catch.

With the foregoing and minor objects in view, the invention resides in the novel subject matter hereinafter described and claimed, description being accomplished by reference to the accompanying drawing.

Fig. 1 is a perspective view showing the trap set.

Fig. 2 is a view similar to Fig. 1 but looking in the opposite direction.

Fig. 3 is a side elevation looking in the same direction as Fig. 1 and showing the trap in trapping position.

Preferred features of construction have been shown for illustrative purposes, and while such features will be specifically described, numerous variations may be made within the scope of the invention as claimed.

I provide a horizontally elongated body or base 5 formed from a metal plate or bar, one end portion of this bar being provided with a downwardly and longitudinally extending finger 6 to engage the ground and assist in properly supporting the trap. Pivoted against one side of the bar 5, at the end thereof remote from finger 6, is an abutment 7 to which the anchoring chain 8 is connected, said abutment being in the form of a short lever pivoted between its ends at 9 to said bar 5. A link plate 10 preferably lies against the side of the abutment 7 remote from the bar 5, said link plate being held at one end by the pivot 9 and being connected at its other end with the bar 5 by a rivet or the like 11 forming the pivot of the jaw 12, the other jaw 13 being suitably pivoted at 14 against the side of said bar 5 engaged by the jaw 12. The jaw-actuating spring 15 of the conventional U-form, is provided with the usual openings or eyes 16, the innermost of which is engageable with the lower end portion of the jaw 12 and the outermost of which abuts the abutment 7. The downwardly projecting lower end of this abutment, the finger 6 and the spring 15 all coact in forming a three-point support for the trap, and by swinging said spring to one position or another, the jaws 12 and 13 may be supported in the most advantageous plane.

Both of the jaws 12 and 13 are swingable from raised set position (Figs. 1 and 2) to lowered trapping position (Fig. 3), and to insure proper joint movement of said jaws, they are connected by a link 17. One end of this link is pivoted at 18 to the jaw 12 above the pivot 11 of the latter, and the other end of said link is pivoted at 19 to a portion 13' of the jaw 13 projecting below the pivot 14 of said jaw 13. When the trap is set, with the jaws 12 and 13 substantially vertical, the link 17 extends across the angle between jaw 12 and base bar 5 as seen in Figs. 1 and 2, and when the trap is sprung, said link moves longitudinally of said base bar 5 under the influence of the downwardly and inwardly swinging jaw 12, said link then serving to force anything out of the way which might otherwise be caught between the lower end portion of the jaw 12 and the upper edge of the base bar 5. The jaw 13, when the trap is set, is inclined outwardly to some extent as shown in Figs. 1 and 2 and thus the initial closing movement of this jaw, at least directly above the pivot 14, is upward and inward as indicated by the arrow A of Fig. 2, the result being that the jaw will throw off anything which might otherwise be caught between said jaw and the base bar 5 with danger of interfering with trap closing. The finger 6 extends sufficiently downward to prevent the extension 13' of the jaw 13 from striking the ground during closing of the jaws.

The jaw 13 is provided near its pivot 14 with a lateral stud 20 and a latch arm 21 normally overlies this stud as seen in Fig. 1 to hold the trap set, one end of this latch arm 21' being loosely connected with the base bar 5 by a link 22 while the other end of said latch arm is cooperable with an upstanding trigger 23 pivoted to the base bar 5 and disposed between the jaws 12 and 13. When the trap is set and the animal pushes against the trigger 23 with his chest, this trigger releases the latch arm 21 and the spring 15 immediately acts against the jaw 12, and at the same time link 17 acts upon the jaw 13, causing instantaneous downward and inward swinging of said jaws to catch the animal around the neck and instantly kill him. The jaws and the upper edge of the base bar 5 coact in forming virtually a ring which constantly decreases in size to effectively act upon the neck of the animal and insure instantaneous death.

The trigger 23 is preferably formed from a single piece of wire bent into the shape of an arch, the ends of the wire being provided with eyes 24 loosely engaged with openings 25 in the base bar 5 to pivotally mount the trigger. One leg of this arched trigger is provided with an inwardly bent C-shaped portion 26 whose upper side coacts with a slightly concave seat 27 at the free end of the latch arm 21 to hold the trap set, as seen in Fig. 1. The top or crown bar of the trigger 23 is substantially horizontal to effectively support grass or any other camouflage which may be used, and to prevent such camouflage from sliding out of place, the ends of said top or crown bar are provided with upwardly bent lug portions 28.

The arm 21 and link 22 are preferably connected with each other by providing them with interengaged eyes 29 and 30, and in pivoting said link 22 to the base bar 5, I prefer to provide said link with a loop 31 through which the pivot 32 passes. This link 22 is preferably embraced by a loop 33 carried by the downwardly projecting portion 13' of the jaw 13, which loop prevents excessive displacement of the link 22 when the trap is sprung and assists in guiding said link to proper position when setting the trap. It will also be observed from Fig. 1 that when the trap is set, the link 22 directly underlies the loop 33, assisting materially in holding the jaw 13 in set position. With the trap set, the latch arm 21 is confined between a portion of the jaw 13 and an upstanding lug 34 on the base bar 5, so that no matter which way the animal may push the trigger 23, said trigger will move from engagement with said latch arm, instead of merely causing said latch arm to move with said trigger.

The jaw 12 is preferably provided with a looped outer end portion 35 through which the jaw 13 passes when the trap is sprung, and the outer end 36 of said looped portion 35 is preferably enlarged to insure entrance of the jaw 13, even if one jaw or the other should be somewhat distorted.

The trap is set in the burrow or other opening, substantially as shown in Figs. 1 and 2 and is anchored by means of the chain 8, grass or other suitable camouflage being preferably used. When the animal attempts to pass the trap, he naturally raises his head over the trigger 23 and in proceeding, his chest strikes said trigger, thereby releasing the jaws and causing them to close instantaneously about his neck, causing immediate death.

As shown in Fig. 3, the jaws do not close sufficiently to allow the inner edges of said jaws to reach the upper edge of the base bar 5. This insures that the leg of a relatively small animal cannot be caught in the trap. If the leg, for instance, of a large animal should be caught between the jaws and the base bar 5, the animal will naturally jerk upon the trap. Such jerking causes the abutment 7 to swing from its normal operative position, into a position in alinement with the base bar 5, thereby releasing the outer eye of the spring 15 and consequently relieving the trap from the pressure of this spring, with the result that the animal can readily free itself. Furthermore, should the trapper become accidentally caught, he may stand upon the chain 8 and pull upon the arm of the spring adjacent said chain, thus swinging the abutment 7 to released position and readily freeing himself. Then too, should the trapper desire, the traps and their springs may be packed separately and the spring of any trap applied at the time of setting said trap.

From the foregoing taken in connection with the accompanying drawing, it will be seen that novel and advantageous provision has been made for carrying out the objects of the invention, and it will be clear to those skilled in the art, that the trap possesses numerous advantages over other known structures. While the details disclosed are preferred, attention is again invited to the possibility of making variations within the scope of the invention as claimed.

I claim:—

1. A trap comprising a body, two jaws pivoted on parallel axes to said body to swing downwardly and inwardly from raised set positions to lowered trapping positions, spring means for swinging said jaws to said trapping positions, and means for holding said jaws in said set positions including a releasing trigger swingable toward either side of the trap to release the jaws.

2. A trap comprising a base, two spring-actuated, trigger-held jaws pivoted to said base for movement from raised set positions to lowered trapping positions, and a link connecting said jaws for movement in unison, said link serving to so position one of said jaws that the portion of said one jaw directly above its pivot will initially move upward when the trap is sprung, whereby said one jaw will throw upwardly anything resting thereon which might interfere with closing of the trap, said link extending across the angle between the other jaw and the base when the trap is set and having inward movement along said base when the trap is sprung, whereby said link will clear said base in the path of said other jaw.

3. A trap comprising a body, two jaws pivoted to said body on parallel axes to swing downwardly and inwardly from raised set positions to lowered trapping positions, one of said jaws having a loop through which the other jaw moves when said jaws are swung to said trapping positions, spring means for swinging said jaws to said trapping positions, and means for holding said jaws in said set positions including a releasing trigger.

4. A trap comprising a horizontally elongated body having a ground-engaging downward projection at one end and a downwardly and longitudinally extending ground-engaging finger near its other end, one jaw pivoted to said one end of said body, a second jaw pivoted to said other end of said body above said finger, said second jaw having an extension which is prevented from striking the ground by said finger, a link pivoted to said extension and pivoted to said one jaw to insure downward and inward swinging of the two jaws in unison from raised set positions to lowered trapping positions, spring means for swinging said jaws to said trapping positions, and means for holding said jaws in said set positions including a releasing trigger.

5. A trap comprising a base, two spring-actuated jaws pivoted to said base to swing downwardly and inwardly from raised set positions to lowered trapping positions, a trigger pivoted to said base between said jaws and occupying an upstanding position while the trap is set, said trigger being swingable in directions at right angles to the swinging movement of the jaws, means including a pivoted upwardly swingable latch arm cooperable with said trigger for holding the jaws set, and a lug on said base positioned to hold said latch arm against movement in one direction at right angles to its intended movement if said trigger be moved in said one direction, said latch arm and one of said jaws occupying such relative positions when the trap is set as to hold said latch arm against movement in the opposite direction if said trigger be moved in this direction, whereby movement of the trigger in either direction will spring the trap.

6. In a trap having a base, and simultaneously operable downwardly swingable spring-actuated jaws pivoted to said base; means for holding one of said jaws in raised set position including an arm engageable with the jaw and connected with said base, and an upstanding trigger pivoted to said base between said jaws and having a shoulder engaging said arm.

7. A structure as specified in claim 6; said trigger comprising an arched piece of wire having a C-shaped inwardly bent formation on one of its legs, a portion of said C-shaped formation constituting said shoulder.

8. A structure as specified in claim 6; said trigger comprising an arched piece of wire having a C-shaped inwardly bent formation on one of its legs, a portion of said C-shaped formation constituting said shoulder, the crown bar of said arched piece of wire being horizontal to allow the hanging of camouflage thereon and having upwardly bent lug portions to prevent sliding of the camouflage therefrom.

9. A structure as specified in claim 6; said arm being connected with said base by means of a link pivoted to both said arm and said base, said one jaw having a loop loosely surrounding said link to prevent excessive displacement thereof.

10. In a trap having a jaw-actuating spring and an anchoring chain; a movably mounted releasing device for freeing the trap jaw or jaws from the action of said spring, said anchoring chain being connected with said releasing device for releasing the same if the trap be pulled with sufficient force.

11. In a trap having the usual U-shaped jaw-operating spring with openings in its ends receiving part of the trap base; an abutment against which one end of said spring reacts, said abutment being connected with said base for movement to a position at which it frees the trap jaw or jaws from the action of said spring, and an anchoring chain for the trap connected to said abutment for releasing the latter if the trap be pulled with sufficient force.

12. A trap comprising a horizontally elongated base having a longitudinal upper edge, two spring-actuated neck-gripping jaws pivoted on parallel axes to longitudinally spaced portions of said base, said jaws both projecting upwardly from said base in horizontally spaced relation with each other when the trap is set, said jaws being both swingable inwardly and downwardly toward said upper edge of said base when the trap is sprung and being sufficiently long to overlap each other as they approach said upper edge of said base, whereby both of said jaws coact with said upper edge of said base to tightly surround the animal's neck, and means for holding said jaws in said upwardly projecting positions, including a releasing trigger above said base and between said jaws.

RICHARD J. JOHNSON.